Feb. 26, 1957 B. M. WALKER ET AL 2,783,173
METHOD OF MAKING LAMINATED TUBING
Filed July 1, 1954
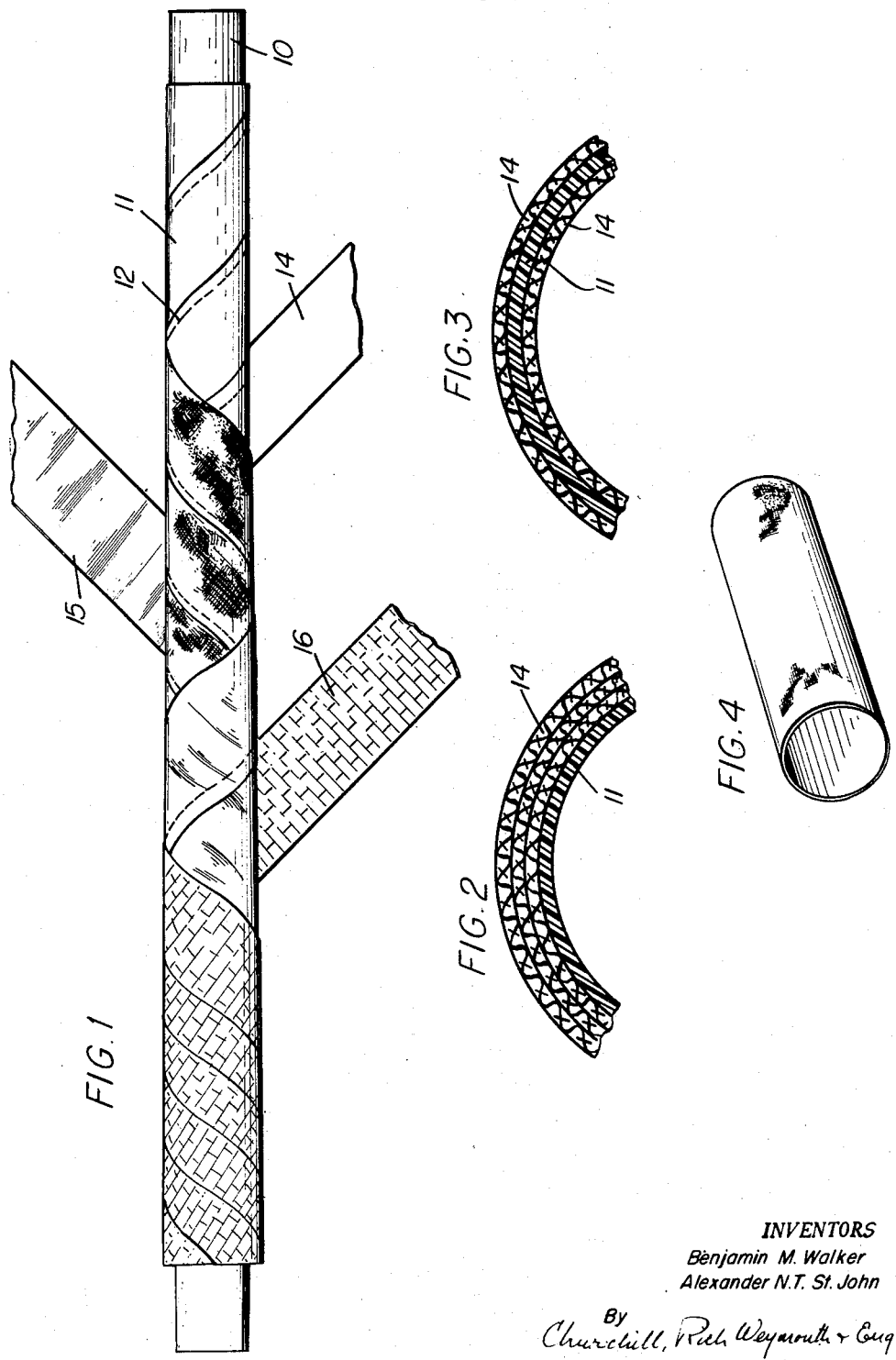
INVENTORS
Benjamin M. Walker
Alexander N.T. St. John
By Churchill, Rich Weymouth & Engel
Attorneys United States Patent Office 2,783,173
Patented Feb. 26, 1957

2,783,173

METHOD OF MAKING LAMINATED TUBING

Benjamin M. Walker, Caldwell, and Alexander N. T. St. John, Glen Ridge, N. J., assignors to Resistoflex Corporation, Belleville, N. J., a corporation of New York Application July 1, 1954, Serial No. 440,802

6 Claims. (Cl. 154—83)

This invention relates to the method of making laminated tubing or pipe, built up from sheets or strips of resinous materials and reinforcement wrapped on a mandrel, which laminations are fused into an integral body by heat while still on the mandrel.

In the making of pipe or tubes from reinforcing fabric, impregnated with various kinds of resins, by wrapping it radially or helically on a mandrel, sometimes combining therewith one or more layers of unreinforced plastic or resin film with the layers of impregnated fabric, it is essential to the production of good pipe that the several layers be firmly bonded to one another so that there are no voids in the wall and so that no delamination occurs in use. To this end the resin components of adjacent layers must be fused together under pressure.

One object of the invention is to provide a simple and effective way of applying the pressure to the laminations in order to firmly bond them together.

Another object is to distribute evenly the pressure and at the same time give the outer surface of the pipe a smooth finish.

As illustrative of the invention and to show how it is applied in practice a specific embodiment thereof will now be described, taken in conjunction with the drawings, in which:

Fig. 1 shows a mandrel with various layers helically wrapped thereon to form the pipe and to apply pressure thereto;

Fig. 2 is an enlarged fragmentary cross-section through a pipe wall having a plastic liner and a plurality of covering layers of plastic impregnated fabric;

Fig. 3 is a similar view of a pipe wall having a plastic layer between layers of impregnated fabric; and Fig. 4 is a perspective view of a short length of thin-walled finished pipe.

The invention, for purposes of illustration, will be described with reference to the making of a pipe in which the reinforcement is glass fabric and the resin is "Teflon" (polytetrafluoroethylene). This resin can be fused or bonded to itself under pressure by sintering at a temperature above about 620° F., is very tough, has high heat resistance and is chemically inert. When reinforced with glass fabric it makes an ideal pipe for use in the chemical and food processing industries. A closely related material, which may be used is "Kel-F" (polytrifluorochloroethylene). These two materials are hereinafter referred to as "fluorocarbon resin." While the invention is particularly adapted to these materials it will be evident that it is applicable to a wide variety of other materials.

Referring to Fig. 1, the pipe is built up on a mandrel 10 which has a smooth surface and may be made, for example, of polished steel, chromium plated steel, stainless steel or the like. The mandrel is first lubricated generously with silicone oil, such as mold release oil, and is prebaked at a temperature of about 750° F. for about one hour. After cooling, it is given another coating of silicone oil. A layer of Teflon tape or film 11 is then helically wrapped thereon with an overlap as shown at 12 to provide the lining of the pipe. This layer is made of unreinforced Teflon film and provides a smooth inner layer and a barrier impervious to fluids. One or more such layers may be used as desired, and successive layers may be wrapped helically in opposite directions or parallel to the mandrel axis.

Over the inner layer or layers of unreinforced plastic one or more wrappings of reinforcing material are applied to build up the wall of the pipe. One such layer 14 of Teflon-impregnated glass fabric is shown, it being understood that as many layers as are desired of impregnated fabric may be used to produce the proper strength and wall thickness. A layer of unreinforced film may be applied on the outside too as a protective covering useful in some applications.

Optionally, over the outermost layer, a strip 15 of steel shim stock or other thin smooth metal is next applied. For medium size pipe this may be about .002" thick. For smaller sizes, in order to obtain greater flexibility, thinner material may be used having a thickness of .001". This wrapping provides a smooth surface finish on the finished pipe and also serves to distribute pressure, as hereinafter described.

Instead of steel shim stock, a strip of any other metal can be used which will not oxidize excessively or lose too much strength in contact with the fluorocarbon resin at sintering temperature. Copper or brass can be used but are not desirable only for the reason that they have been found to produce a dark discoloration of the resin which may be due to some reaction with traces of resin decomposition products or to excessive oxidation and deposit of metal oxides in the resin surface. By plating the copper or brass strip with nickel or chromium or both, so that the surface does not contain copper, such discoloration can be avoided. Aluminum is unsatisfactory because it is too soft and too readily deformed at sintering temperature. The term "hard metal" in the claims is used for the purpose of excluding it. Steel, stainless steel and nickel are representative of the type of metal preferred.

Over the layer of metal tape, if used, or over the outermost layer of the pipe wall if it is not used, a final layer 16 of woven glass tape is tightly wrapped, preferably overlapping itself by half its width. This tape may, for example, have a thickness of about .01" and the overlap gives a double layer. The purpose of this wrapping is to apply pressure to the laminations of the pipe wall during sintering as will presently be explained.

When all the above-described wrappings are in place, the mandrel is placed in an oven for sintering at a temperature which, for Teflon, should be above 620° F. and not over 800° F. The preferred range is between 680° F. and 750° F. When the assembly on the mandrel is heated to these temperatures, the wrapping of glass tape applies high pressure to the layers due to the fact that the coefficient of thermal expansion of glass (about $8 \times 10^{-6}$) is considerably less than that of Teflon (about $5.5 \times 10^{-5}$) which, upon heating, therefore builds up internal pressure. This pressure in conjunction with the high temperature causes the Teflon film layers and the Teflon in the impregnated fabric 14 to fuse. The wrapping 15 of metal tape tends to equalize the pressure applied by the glass tape and produces a smooth surface. However, if it is not objectionable to have a pipe with the impression of the glass fabric 16 on its outer wall, the wrapping of metal strip 15 may be omitted and the glass tape 16 applied directly over the last layer of impregnated fabric 14.

After subjection of the assembly to sintering temperatures for the necessary length of time to produce complete fusion, the mandrel is removed from the oven and allowed to cool. Whereupon the wrapping 16 of glass tape and the wrapping 15 of metal, if used, are removed and the finished pipe is pulled from the mandrel.

Pipe fabricated as above described may have a wall which is very thin relative to the diameter, yet having sufficient strength to be self-supporting in pieces of considerable length. Such a thin wall pipe is shown in Fig. 4.

Fig. 2 shows a cross-section through the wall of a pipe with the liner 11 of solid Teflon and three reinforcing layers 14 of impregnated glass fabric, all bonded into a unitary structure. Fig. 3 shows a modification in which the Teflon layer 11 is placed between two layers of impregnated glass fabric 14 by applying the layers in a different order. It will be understood that in these figures the thickness of the layers is considerably exaggerated.

In making long lengths of pipe, it is usually preferable to use a helical wrapping. However, the invention contemplates wrapping one or more of the layers in a direction parallel to the mandrel axis. The method of wrapping used is merely a matter of choice. However, the temporary wrapping of glass tape which provides the pressure during sintering is preferably wrapped helically so as to assure maintenance of the pressure.

It is to be understood that the specific embodiment above described is merely for purposes of illustration and that the scope of the invention sought to be protected is limited only by the appended claims. In particular, the applying of pressure during the heat treatment by glass tape wrapped over layers composed largely of Teflon merely illustrates the principle which applies equally well to any other resin having a higher coefficient of expansion than the glass tape or other low expanding material of which the outer wrapping is composed.

What is claimed is:

1. The method of making reinforced fluorocarbon resin pipe which comprises wrapping on a mandrel a plurality of layers of fabric impregnated with said resin, tightly wrapping thereon a layer of glass fabric tape, heating the thus formed assembly to sintering temperature to fuse the adjacent resin surfaces of said impregnated fabric together, cooling the assembly, removing said tape, and removing the pipe from the mandrel.

2. The method of making reinforced fluorocarbon resin pipe which comprises wrapping on a mandrel a plurality of layers of fabric impregnated with said resin and at least one layer of a solid film of said resin, tightly wrapping thereon a layer of glass fabric tape, heating the thus formed assembly to sintering temperature to fuse the adjacent resin surfaces of said solid film and said impregnated fabric together, cooling the assembly, removing said tape, and removing the pipe from the mandrel.

3. The method of claim 2 wherein said layer of film is the innermost layer applied on the mandrel.

4. The method of claim 2 wherein said layer of film is applied between two layers of impregnated fabric.

5. The method of claim 2 wherein a thin strip of sheet metal is wrapped on the outermost layer of the pipe wall before the glass fabric tape is wrapped thereon, said strip being of hard metal and having a surface which does not contain copper.

6. The method of making reinforced fluorocarbon resin pipe which comprises wrapping on a mandrel a plurality of layers of fabric impregnated with said resin, tightly wrapping thereon a layer of thin sheet metal strip, said strip being of hard metal and having a surface which does not contain copper, tightly wrapping on said strip a layer of glass fabric tape, heating the thus formed assembly to sintering temperature to fuse the adjacent resin surfaces of said impregnated fabric together, cooling the assembly, removing said tape and said metal strip, and removing the pipe from the mandrel.

References Cited in the file of this patent

UNITED STATES PATENTS

| | | |
|---|---|---|
| 2,417,586 | Crosley | Mar. 18, 1947 |
| 2,454,625 | Bondon | Nov. 23, 1948 |
| 2,459,653 | Keyes | Jan. 18, 1949 |
| 2,475,194 | Nyquist et al. | July 5, 1949 |
| 2,609,319 | Boge | Sept. 2, 1952 |
| 2,643,700 | Havens | June 30, 1953 |
| 2,691,694 | Young | Oct. 12, 1954 |

OTHER REFERENCES

Modern Plastics, "New High Temperature Thermoplastic," Oct. 1948, pages 168, 170 and 172.